United States Patent
Thomsen et al.

(10) Patent No.: US 12,340,252 B2
(45) Date of Patent: Jun. 24, 2025

(54) PRIORITY-BASED LOAD SHEDDING FOR COMPUTING SYSTEMS

(71) Applicant: Uber Technologies, Inc., San Francisco, CA (US)

(72) Inventors: Jakob Holdgaard Thomsen, Risskov (DK); Jesper Lindstrøm Nielsen, Lystrup (DK); Timothy Smyth, Hoboken, NJ (US); Vladimir Gavrilenko, Aarhus (DK)

(73) Assignee: Uber Technologies, Inc., San Francisco, CA (US)

( * ) Notice: Subject to any disclaimer, the term of this patent is extended or adjusted under 35 U.S.C. 154(b) by 550 days.

(21) Appl. No.: 17/850,378

(22) Filed: Jun. 27, 2022

(65) Prior Publication Data

US 2023/0418676 A1    Dec. 28, 2023

(51) Int. Cl.
*G06F 9/50*    (2006.01)

(52) U.S. Cl.
CPC .................................... *G06F 9/505* (2013.01)

(58) Field of Classification Search
None
See application file for complete search history.

(56) References Cited

U.S. PATENT DOCUMENTS

| | | | | |
|---|---|---|---|---|
| 5,440,741 | A * | 8/1995 | Morales | G06F 9/505 719/310 |
| 6,836,785 | B1 * | 12/2004 | Bakshi | H04L 49/9073 709/224 |
| 7,007,087 | B1 * | 2/2006 | Souma | G06F 9/5083 709/203 |
| 8,380,850 | B1 * | 2/2013 | Ahuja | H04L 67/60 709/224 |
| 8,392,558 | B1 * | 3/2013 | Ahuja | G06F 9/505 709/227 |
| 9,588,799 | B1 * | 3/2017 | Burruss | H04L 67/1097 |
| 10,075,827 | B1 * | 9/2018 | Kodaypak | H04W 28/0247 |
| 10,819,777 | B1 * | 10/2020 | Nienaber | H04L 47/803 |
| 11,750,528 | B2 * | 9/2023 | Mishra | H04L 47/805 709/229 |

(Continued)

OTHER PUBLICATIONS

Google, "Handling Overload," 2016, 15 pages, [Online] [Retrieved on Jul. 13, 2023] Retrieved from the Internet URL: <https://sre.google/sre-book/handling-overload/#criticality-00sDCK>.

(Continued)

*Primary Examiner* — Adam Lee
(74) *Attorney, Agent, or Firm* — Fenwick & West LLP

(57) ABSTRACT

An online system performs load shedding in case of system overloads. The system maps each request to a tier and a cohort. The tier is determined based on a type of request and the cohort is determined based on the user. Each tier includes multiple cohorts. The tiers and cohorts are ranked by priority. If the system determines that the system is overloaded, the system determines a threshold tier and a threshold cohort for load shedding. The threshold tier and threshold cohort indicate a threshold priority of requests that are processed. If the system determines that the unprocessed request has a priority below the threshold priority indicated by the threshold tier and the threshold cohort, the system rejecting the unprocessed request. The system executes unprocessed requests that are not rejected.

20 Claims, 8 Drawing Sheets

(56) References Cited

U.S. PATENT DOCUMENTS

| | | | | |
|---|---|---|---|---|
| 2003/0101265 | A1* | 5/2003 | Dantzig | H04L 67/1012 709/226 |
| 2004/0062199 | A1* | 4/2004 | Lau | H04L 1/20 370/230 |
| 2005/0111367 | A1* | 5/2005 | Jonathan Chao | H04L 63/1408 370/235 |
| 2005/0195834 | A1* | 9/2005 | Kikuchi | H04L 67/1012 370/396 |
| 2005/0273456 | A1* | 12/2005 | Revanuru | H04L 67/1001 |
| 2006/0013132 | A1* | 1/2006 | Garnett | H04L 49/90 370/229 |
| 2007/0121673 | A1* | 5/2007 | Hammer | H04L 41/026 370/468 |
| 2008/0175152 | A1* | 7/2008 | Laselva | H04L 47/12 370/235 |
| 2010/0149986 | A1* | 6/2010 | Johnson | H04L 43/16 370/237 |
| 2011/0103557 | A1* | 5/2011 | Shah | G06F 9/5083 455/466 |
| 2011/0170409 | A1* | 7/2011 | Kovacs | H04L 47/70 370/230.1 |
| 2012/0278511 | A1* | 11/2012 | Alatorre | G06F 3/0605 710/33 |
| 2013/0046879 | A1* | 2/2013 | Garcia | H04L 47/724 709/224 |
| 2013/0188483 | A1* | 7/2013 | Teepell | H04L 43/0876 370/235 |
| 2014/0282528 | A1* | 9/2014 | Bugenhagen | G06F 11/30 718/1 |
| 2014/0282529 | A1* | 9/2014 | Bugenhagen | G06F 9/50 718/1 |
| 2015/0046506 | A1* | 2/2015 | Park | G06F 9/5083 709/201 |
| 2016/0080290 | A1* | 3/2016 | Wiehe | H04L 67/01 370/235 |
| 2016/0314012 | A1* | 10/2016 | Rong | H04L 47/263 |
| 2016/0353326 | A1* | 12/2016 | Novo Diaz | H04L 67/1036 |
| 2018/0331960 | A1* | 11/2018 | Browne | H04L 47/2441 |
| 2019/0166056 | A1* | 5/2019 | Tang | H04L 43/00 |
| 2020/0136911 | A1* | 4/2020 | Assali | H04L 47/125 |

OTHER PUBLICATIONS

Netflix Technology Blog, "Keeping Netflix Reliable Using Prioritized Load Shedding," Nov. 2, 2020, 17 pages, [Online] [Retrieved on Jul. 13, 2023] Retrieved from the Internet URL: <https://netflixtechblog.com/keeping-netflix-reliable-using-prioritized-load-shedding-6cc827b02f94>.

Maurer, B., "Fail at Scale: Reliability in the face of rapid change," Queue, vol. 13, Iss. 8, Sep. 14, 2015, pp. 1-17.

Zhou, H. et al., "Overload Control for Scaling WeChat Microservices," Proceedings of the ACM Symposium on Cloud Computing, arXiv:1806.04075, Oct. 2018, pp. 149-161.

* cited by examiner

PRIORITY-BASED LOAD SHEDDING FOR COMPUTING SYSTEMS

FIELD OF INVENTION

This present disclosure generally relates to handling loads in servers and more specifically to prioritized load shedding for servers to handle system overloads.

BACKGROUND

Servers receive requests via a network and process them. Servers may experience a sudden increase in loads, for example, due to a sudden increase in demand of some service provided by the server. Servers are designed for certain capacity to handle load. For example, if the rate of incoming requests is below a threshold rate, the server is able to process the requests in reasonable time. However, if the rate of requests exceeds a certain threshold, the server may not be able to handle the load. In this situation the performance of all the requests may degrade significantly. The increased load may be handled by increasing the computing and network resources used by the server. However, increasing the number of resources can be a slow process and load changes can be experienced suddenly. Therefore, typically a computing system may not be able to keep up with sudden load increases. A system may reject certain requests for improving system performance. However, rejecting user requests provides poor user experience since a user may be performing a task that requires a series of requests and rejecting a single request may result in causing the entire task to fail. Furthermore, due to dependencies across systems, performance degrades for other systems that depend on requests processed by the system. In some situations, the performance degradation may create a vicious cycle from which it is difficult for the system to recover.

SUMMARY

According to embodiments described herein, a computing system performs load shedding in the event that the system overloads. The system receives requests for processing. Each request is associated with a user. The system associates or maps each request to a tier and a cohort. The tier is determined based on a type of request and the cohort is determined based on the user. The tier is from a plurality of tiers ranked by priority. Each tier is associated with a plurality of cohorts ranked by priority. If the system determines that the system is overloaded, the system determines a threshold tier and a threshold cohort for load shedding. The threshold tier and threshold cohort indicate a threshold priority of requests that are processed.

In some examples, the system repeats the following steps for each of a set of unprocessed requests. The system determines a tier and a cohort of the unprocessed request. The system compares the tier and the cohort of the unprocessed request with the threshold tier and the threshold cohort to determine whether the unprocessed request has a priority below the threshold priority indicated by the threshold tier and the threshold cohort. If the system determines that the unprocessed request has a priority below the threshold priority indicated by the threshold tier and the threshold cohort, the system rejects the unprocessed request. The system processes, unprocessed requests that are not rejected, for example, by executing a service to process each unprocessed request.

In some embodiments, the system may detect a system overload by monitoring the number of unprocessed requests that are present in a request queue in a given time interval, for example, by determining the number of unprocessed requests received in a unit time and checking if the number exceed a threshold value.

According to an embodiment, the system determines the threshold tier and threshold cohort by determining a percentage of unprocessed requests to be rejected based on a current number of unprocessed requests and an aggregate value based on the number of unprocessed requests over a time interval. The system determines the threshold tier and threshold cohort based on the percentage of unprocessed requests to be rejected.

Alternatively, the system determines the threshold tier and threshold cohort by identifying requests received in a recent time interval and determining a cumulative distribution of frequency of occurrence of requests in each cohort of each tier. The system determines the threshold tier and threshold cohort as the tier and cohort from the cumulative distribution corresponding to the percentage of unprocessed requests to be rejected.

The cohort for an unprocessed request may be determined based on a user identifier of the user that sent the request and a value of current time. The cohort of the request has a first value when the current time is within a time interval and the cohort of the request has a second value when the current time is outside the time interval.

According to an embodiment, the system assigns requests to tiers based on various criteria including the type of request. For example, the system assigns requests for performing operations related to system infrastructure to a first tier. The system assigns requests that represents actions requested by external users to a second tier having lower priority compared to the first tier. The system assigns requests that represents actions representing test activities to a third tier having lower priority compared to the second tier.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
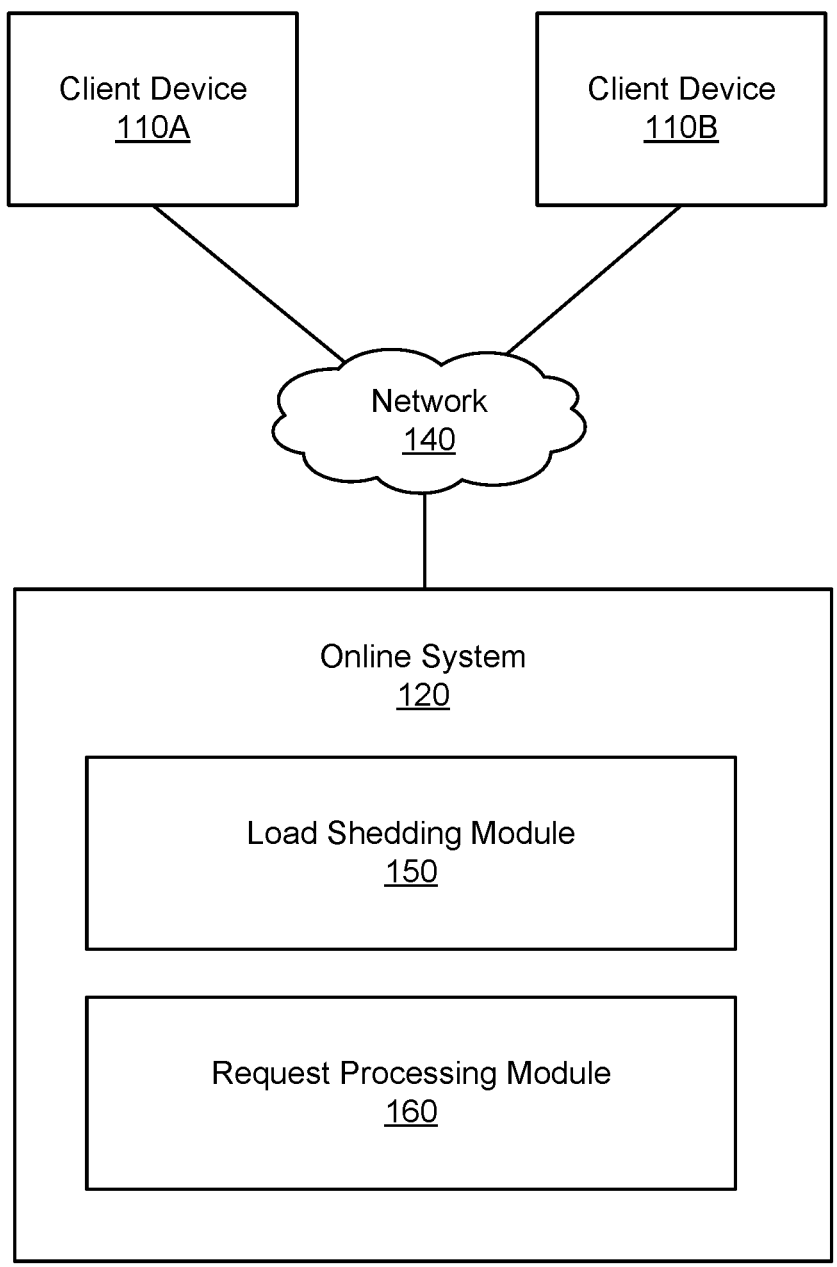
FIG. 1 illustrates a networking environment for an online system, in accordance with one or more embodiments.

FIG. 1 illustrates networking environment for a computing system, in accordance with one or more embodiments. FIG. 1 includes one or more client devices 110A, 110B, a computing system or server(s) (also referred to as an online system, as it communicates with other devices over one or more networks) 120, and a network(s) 140. The online system 120 includes a load shedding module or service 150 and a request processing module or service 160. For clarity, only two client devices 110 are shown in FIG. 1, but any number of client devices 110 may communicate with any component over the network 140. Alternate embodiments of the system environment 100 can have any number of online systems 120. In addition, while FIG. 1 illustrates the online system 120 including the load shedding module 150 and the request processing module 160, depending on implementation, each of the load shedding module 150 and the request processing module 160 may run on different online system 120 that communicate with each other. As an addition or an alternative, the system environment 110 can include multiple online systems 120 in which each online system 120 can run an instance of one or more of the load shedding module 150 and the request processing module 160. The functions performed by the various entities of FIG. 1 may also vary in different embodiments.

The online system 120 receives requests from various client devices 110, from various external systems, or other internal systems (e.g., such as one or more computing systems that communicates with the online system 120 on the same network). In an embodiment, the requests may be generated by services executed within the online system 120. The requests are processed by the request processing module 160. The type of requests processed by the request processing module 160 may vary according to various embodiments. There may be several request processing modules 160 depending on the embodiment.

The request processing modules 160 process requests of different types. Some requests may perform tasks related to system infrastructure management. For example, a request may start or stop certain process, service, or a server. A request may perform a task related to management of a subsystem, for example, storage system. A request may perform a task requested by an external user of the online system 120, for example, a request to execute a transaction. A user may be a person interacting with the system via a user interface or any entity that can send a request, for example, an automatic agent, an application, a service, or a microservice. A service associated with the online system may request the online system to send some content, for example, sponsored content to a client device. According to various embodiments, the request processing module 160 may execute on multiple computing systems, i.e., in a distributed fashion using multiple processors. In some embodiments, the request processing module 160 implements a priority queue that ensures that higher priority requests are processed before lower priority requests. The priority queue may store the requests in order of their priority, thereby making it efficient to identify requests that need to be discarded.

The online system 120 may receive traffic for processing requests that may vary, for example, depending on time, season, and so on. Sometimes the online system 120 may receive a spike in traffic that results in overloading of the online system. A system becomes overloaded when the amount of work being processed by the system exceeds a threshold value, thereby causing the processing of requests by the system to become slow. For example, an average response time of requests in an overloaded system is significantly higher than the average response time of requests in a system that is not overloaded. If the online system 120 gets overloaded, all the users that are using the online system 120 may be affected due to the slow response of the online system 120. An overloaded system may even crash. Therefore, the online system 120 includes the load shedding module 150 that performs load shedding. The load shedding module 150 performs load shedding by rejecting certain requests so that these requests are discarded by the system and never executed.

Load shedding strategies that reject all requests or randomly reject requests affect a very large percentage of users. For example, a user may be in the middle of performing a task that comprises a series of requests using the online system 120. If the online system 120 rejects one of the requests, the entire task being performed by the user may completely fail. For example, if the online system 120 is an online store, the user may send several requests to perform searches, then add items to the shopping cart, then send a checkout request. If the online system rejects the checkout request, the entire transaction that the user was aiming to perform fails. Furthermore, this results in very poor user experience.

The load shedding module 150 according to various embodiments performs load shedding that is highly efficient and affects minimum number of users. Accordingly, the load shedding module 150 helps bring the online system 150 to reach a state that is not overloaded very fast while impacting a minimum number of users as a result of load shedding. The details of the load shedding module 150 are illustrated in FIG. 2 and described in connection with FIG. 2.

The various components of the system environment 100 communicate via one or more network interfaces to communicate over the network 140. The network 140 comprises any combination of local area and wide area networks employing wired or wireless communication links. In some embodiments, all or some of the communication on the network 140 may be encrypted. For example, data encryption may be implemented in situations where the document database 130 is located on a third-party online system separate from the online system 120.

System Architecture

Figure 2:
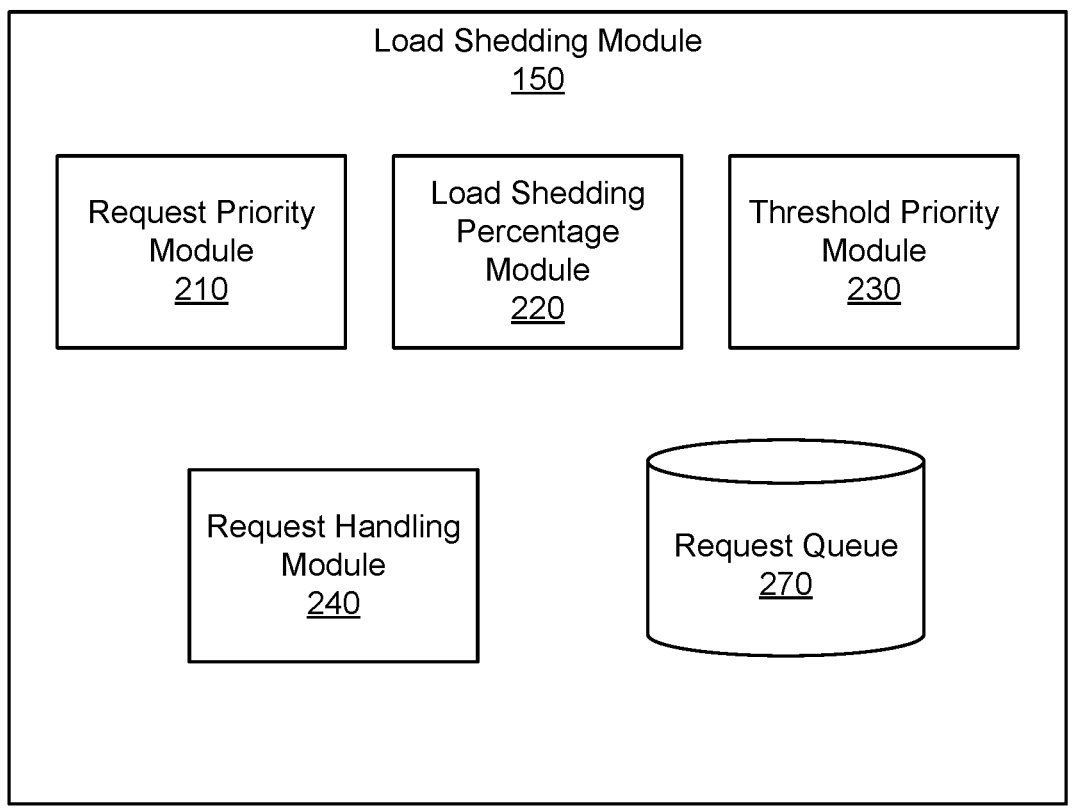
FIG. 2 illustrates an exemplary architecture of the load shedding module, in accordance with one or more embodiments.

FIG. 2 illustrates an exemplary architecture of the load shedding module, in accordance with one or more embodiments. The load shedding module includes a request priority module 210, a load shedding percentage module 220, a threshold priority module 230, a request handling module 240, and a request queue 270.

The request priority module 210 determined a measure of priority of each request that is received. The measure of priority is used to determine whether to discard the request during load shedding. According to an embodiment, the request priority module 210 determines a tier and a cohort for the request.

The load shedding percentage module 220 determines the percentage of requests received that should be discarded in order to perform load shedding at a particular time. The load shedding percentage module 220 determines the percentage of requests received that are discarded periodically. The load shedding percentage module 220 provides the percentage of requests received that should be discarded to the threshold priority module 230.

The threshold priority module 230 receives a percentage of requests received that should be discarded from the load shedding percentage module 220 and determines threshold priority values for implementing load shedding of that percentage of requests. In particular, the threshold priority module 230 determines the threshold tier and threshold cohort values for implementing the load shedding of the given percent of requests such that all requests having a tier and cohort indicative of lower priority compared to the threshold tier and threshold cohort values are rejected.

The request handling module 240 determines whether a request should be processed or rejected. The request handling module 240 executes the overall process that implements load shedding by determining for each request, whether the request should be executed or rejected based on a priority determined for the request. The process of load shedding executed by the request handling module 240 is illustrated in FIG. 3 and described in connection with FIG. 3.

The request queue 270 stores unprocessed requests that were received by the online system. The request processing module 160 is configured to process requests as soon as they are received. Accordingly, if the rate at which requests are received is very high, for example, above a certain threshold value, the request processing module 160 is unable to complete processing a request before a subsequent request is received. If the rate at which requests are received exceeds the rate at which the request processing module 160 is able to process the requests, the requests are stored in the request queue 270. Accordingly, the size of the request queue is an indication of the amount of load on the online system is. A long length of request queue is an indication of the system being highly overloaded. According to an embodiment, the request queue 270 is a priority queue that ensures that requests with high priority are handled before lower priority requests.

Process of Load Shedding

Figure 3:
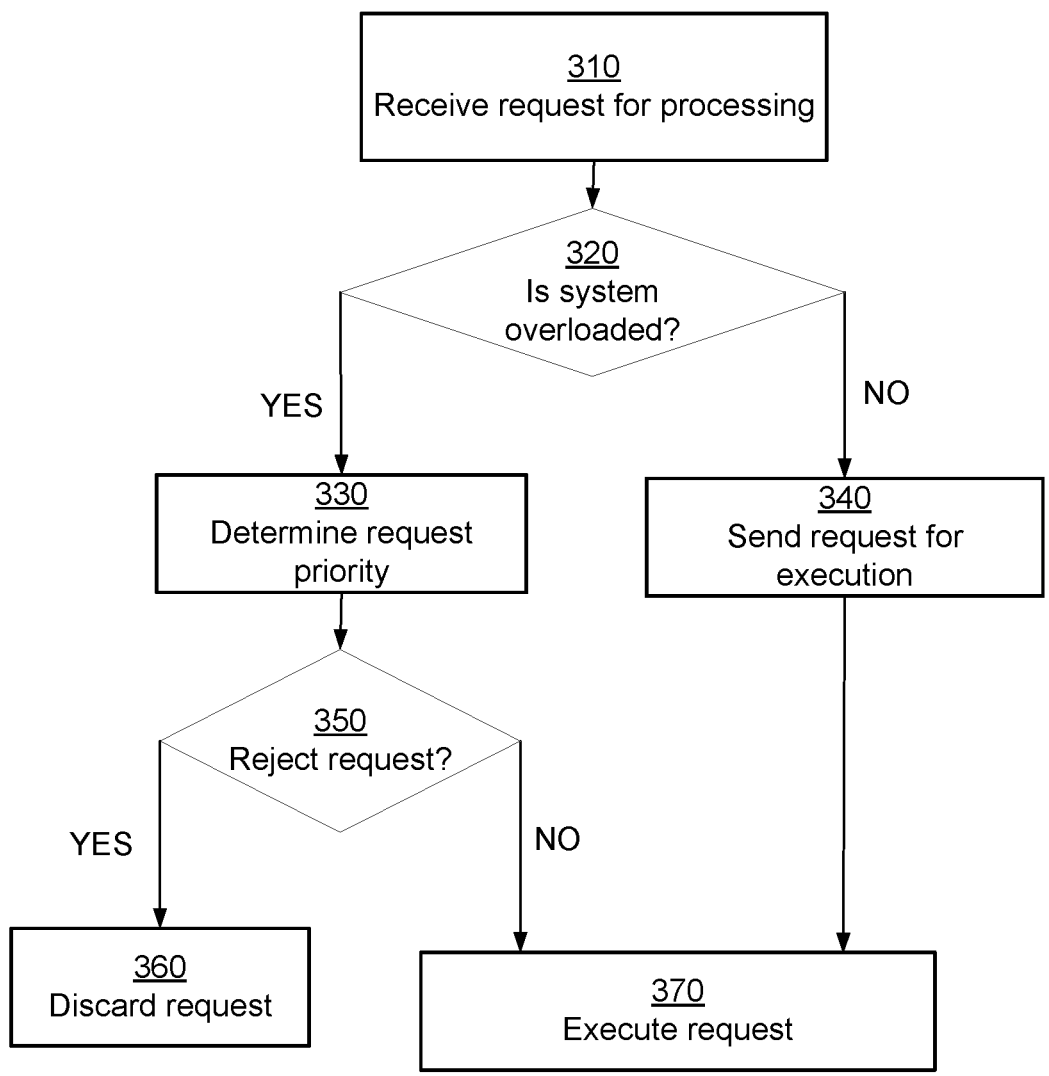
FIG. 3 illustrates a flowchart of a process for load shedding, in accordance with one or more embodiments.

FIG. 3 illustrates a flowchart of a process for load shedding, in accordance with one or more embodiments. In particular, the process illustrated in FIG. 3 shows the steps performed for processing a request received by the online system. The process shown in FIG. 3 is repeated for each request received by the online system.

The online system receives 310 a request for processing. The request may be received from a client device associated with a user. For example, a user may provide credentials to create a session with the online system. The online system may use the credentials to identify the user and determine a user identity for the user.

The online system determines 320 whether the online system is overloaded. According to an embodiment, the online system determines whether it is overloaded based on a size of the request queue, i.e., a number of unprocessed requests that are available at a particular time.

If the online system determines 320 that the system is not overloaded, the online system sends 340 the request for execution 370. Accordingly, when the online system is not overloaded, all requests are sent for processing to the request processing module 160. However, if the online system determines 320 that the system is overloaded, the online system executes the steps for load shedding. Accordingly, the online system determines 330 the priority of the request received based on the tier and the cohort for the request.

The online system periodically determines a threshold tier and a threshold cohort for implementing load shedding. The details of the process to determine the threshold tier and the threshold cohort for implementing load shedding are further described herein, for example, in FIG. 6. The online system determines 350 based on the priority of the request, whether to reject the request or process it. If the online system determines 350 that the tier and cohort of the request indicates a priority that is below the priority corresponding to a threshold tier and threshold the online system discards 360 the request or else the online system executes 370 the request. In some embodiments, the online system uses a priority queue that ensures that higher priority requests are executed 370 before lower priority requests.

Figure 4:
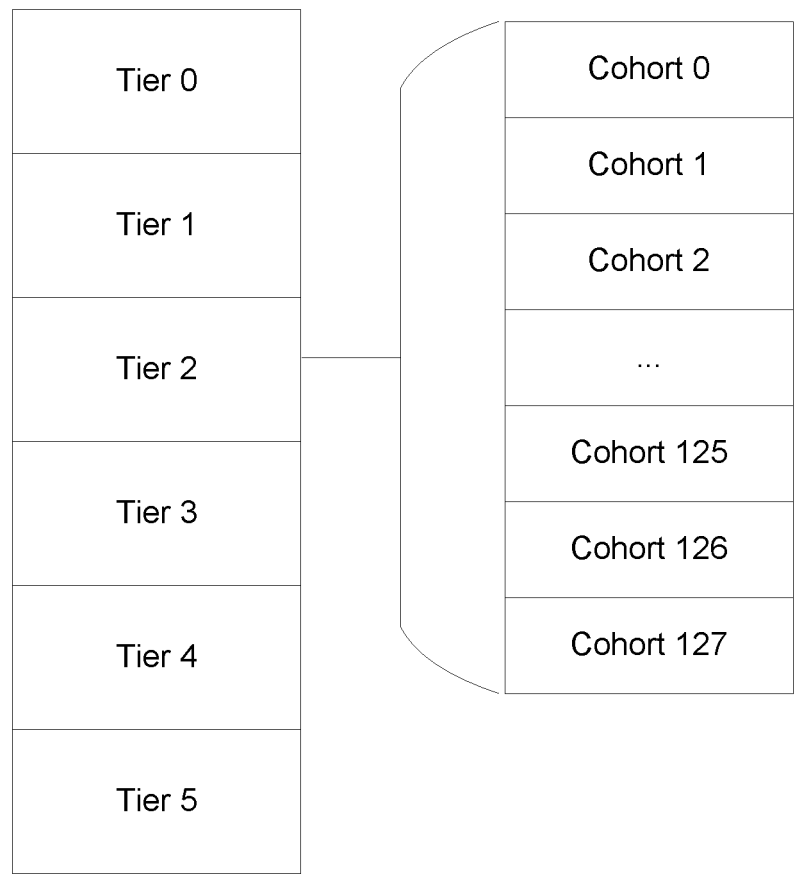
FIG. 4 illustrates tiers and cohorts used for determining whether a request is discarded, in accordance with one or more embodiments.

FIG. 4 illustrates tiers and cohorts used for determining whether a request is discarded, in accordance with one or more embodiments. The different types of requests are mapped to different tiers indicative of a priority of requests of that particular type. The factors used to determine a tier for a request include the type of task requested by the request, attributes of the user that sent the request, a service associated with the request, for example, a service that sent the request or a service that is processing the request. FIG. 4 shows six tiers. Other embodiments may use more or fewer tiers.

Following is an example mapping from requests to tiers. Other embodiments may use a different mapping. Tier 0 represents highest priority requests and tiers with higher indexes (i.e., tiers 2, 3, 4, etc.) represent lower priority requests compared to tier 0. In general, the tiers are ranked, for example, ranked in order of decreasing priority such that a tier N1 is lower priority than tier N2 is N1>N2. Accordingly, higher indexes of the tier have lower priority of requests assigned to the tier. According to other embodiments, the tiers may be ranked in order of increasing priority and the techniques disclosed herein can be modified to handle the ranking.

The requests are assigned to the tiers based on factors including the type of request or the context in which the request was sent. For example, requests processed by system infrastructure components such as requests for maintenance operations of data centers, starting/shutting down servers, and so on are assigned to tier 0; user transactions that are core to the business of the enterprise, e.g., add to cart, checkout, etc. are assigned to tier 1; requests to show content to users such as sponsored content and other actions that are not critical to performing transactions are assigned to tier 3; traffic from internal users, e.g., operational users performing non-critical operations, e.g., generating reports, is assigned to tier 4; lower priority requests, e.g., internal tests performed on the system by internal users that can be performed at a later stage are assigned to tier 5. These are examples of types of requests and their assignments to tiers. There may be other types of requests and ways to assign requests to tiers depending on the type of enterprise or the domain of the enterprise.

According to an embodiment, the cohort for an unprocessed request is determined based on a user id of the user that sent the request. Accordingly, a set of users is assigned a low priority cohort and during a time interval the requests received from the low priority cohort may be rejected in case of system overload. The system changes the assignment of users to cohorts periodically, for example, every hour. According to an embodiment, the cohort for an unprocessed request is determined based on a user id of the user that sent the request and a value of current time. Accordingly the cohort of the request from a user has a value C1 when the current time is within a time interval T1 but cohort may have a different value C2 when the current time is outside the time interval T1. According to an embodiment, the cohort for a request from a user id U1 is determined using the expression "func(U1, timestamp) % num_cohorts" where func is a function that combines the user id U1 and current timestamp, for example, a sum of the user ID and the current hour determined from the timestamp. The value num-cohort is the maximum number of cohorts in a tier, for example, 128 cohorts and '%' is the mod function that determined a remainder value.

Figure 5:
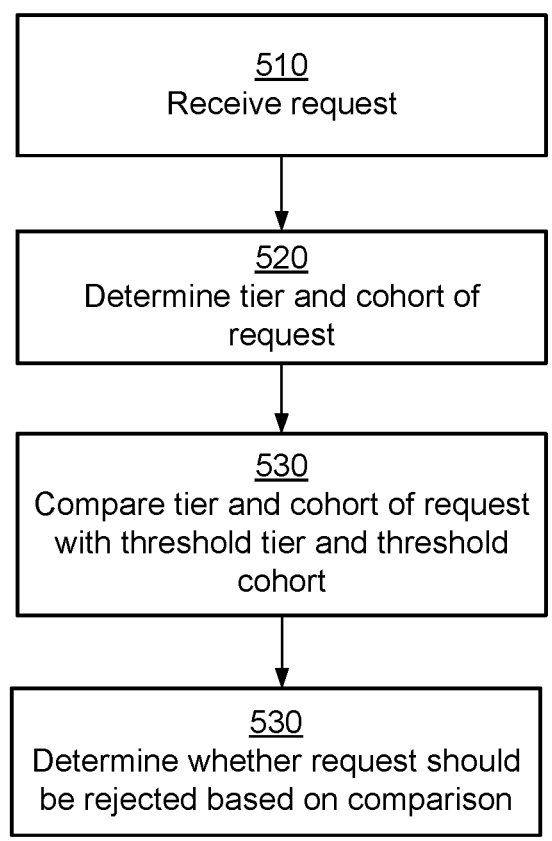
FIG. 5 illustrates a flowchart of a process for determining whether to reject a request for load shedding, in accordance with one or more embodiments.

FIG. 5 illustrates a flowchart of a process 500 for determining whether to reject a request for load shedding, in accordance with one or more embodiments. The system receives 510 a request that needs to be processed. The system determines 520 the tier and cohort of the request. The system compares the tier and cohort of the request with the threshold tier and threshold cohort determined to load shedding. If the comparison indicates that the request has a priority that is below the priority indicated by the threshold tier and threshold cohort, the request is rejected. If the comparison indicates that the request has a priority that is above the priority indicated by the threshold tier and threshold cohort, the request is sent for execution.

Figure 6:
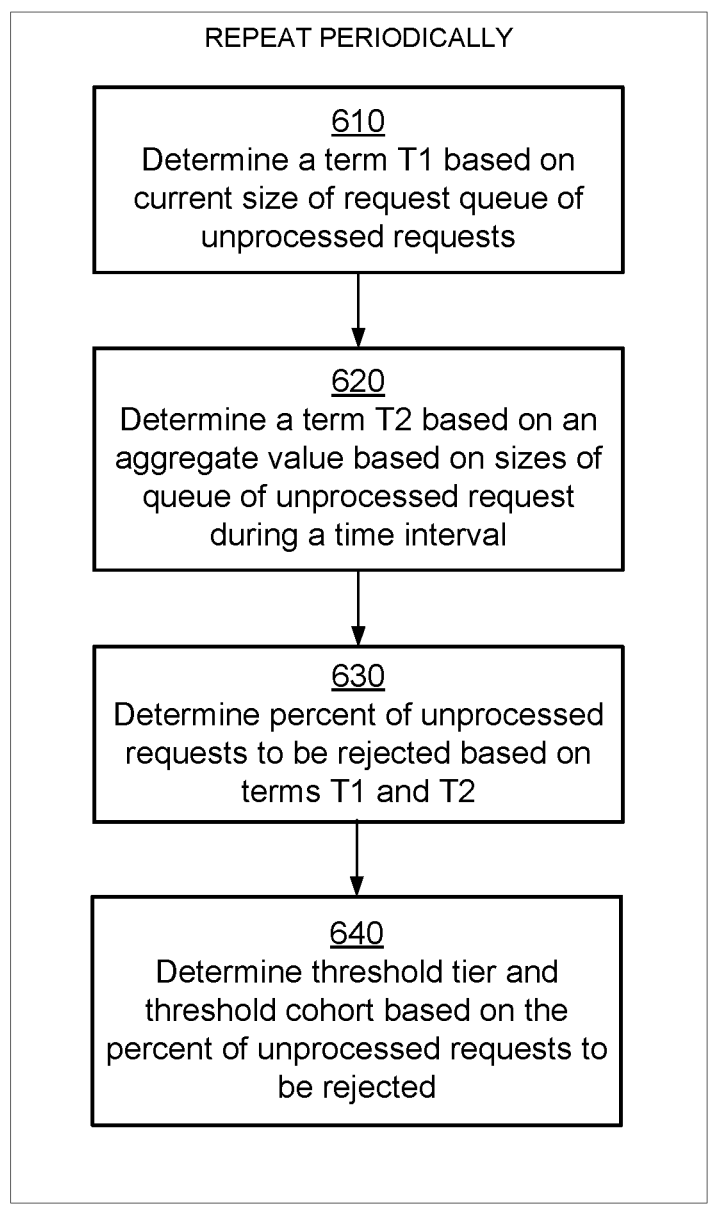
FIG. 6 illustrates a flowchart of a process for determining a percent of requests to be rejected during load shedding, in accordance with one or more embodiments.
Figure 7:
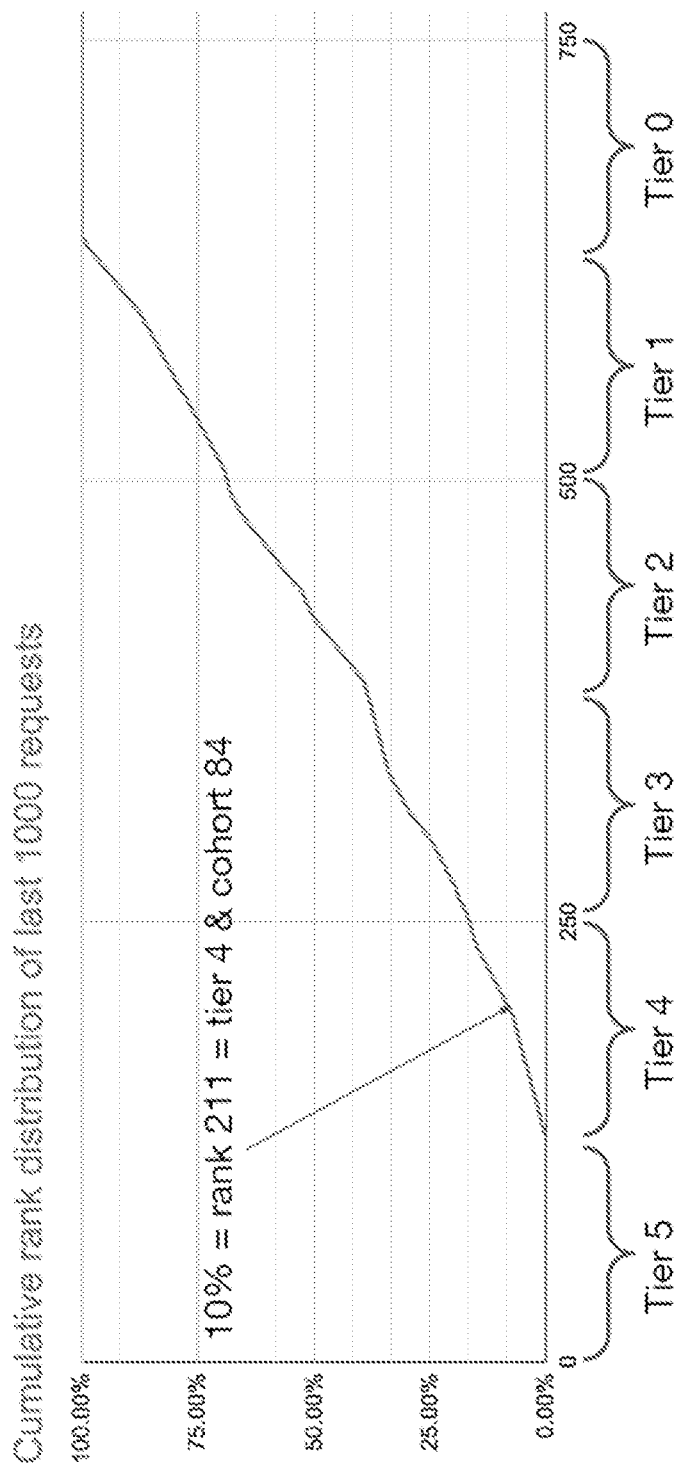
FIG. 7 illustrates an example configuration illustrating how to determine a percent of requests to be rejected during load shedding, in accordance with one or more embodiments.

FIG. 6 illustrates a flowchart of a process for determining a percent of requests to be rejected during load shedding, in accordance with one or more embodiments. The system executes the process 600 illustrated in FIG. 6 periodically to recalculate the percent of requests to be rejected during load shedding. The system monitors the size of request queue to determine a number of unprocessed requests at any given time. The system stores the size of the request queue at various points in time in the past, for example, after every unit time such as a second or a minute. The system determines 610 a term T1 based on the current size of the request queue. The system determines 620 a term T2 based on an aggregate value based on the sizes of queues determined periodically over a larger time interval. The system determines 630 the percent of unprocessed requests to be rejected for load shedding based on the terms T1 and T2. The system determines 640 the threshold tier and the threshold cohort based on the percent of unprocessed requests to be rejected for load shedding. FIG. 7 illustrates the details of the step 640 for determining the threshold tier and threshold cohort.

FIG. 7 illustrates an example configuration illustrating how to determine a percent of requests to be rejected during load shedding, in accordance with one or more embodiments. As illustrated in FIG. 7, the system determines cumulative ranks of a set of recent requests, for example, last 1000 requests or another number of requests that were received in a recent time interval. The system determines a cumulative rank distribution of the requests from the set of requests as illustrated in FIG. 7. The cumulative rank distribution is determined based on the order of priority of the tiers and based on the order of priority of the cohorts within each tier. Accordingly, the tuples (tier, cohort) are ranked in order of priority. The cumulative rank distribution of the requests represents the percent of requests that have priority below a particular (tier, cohort) tuple representing a tier and a cohort within the tier. The system identifies the (tier, cohort) corresponding to the percentage of requests that need to be rejected for purposes of load shedding. The system uses the identified (tier, cohort) as the (threshold tier, threshold cohort) for implementing the load shedding. Accordingly, the system rejects a request if the request has a (tier, cohort) that is below the (threshold tier, threshold cohort) determined for load shedding and executes the request otherwise.

In some embodiments, the online system executes a recalibration step that determines the request rank threshold (i.e., the priority and cohort) for load shedding. The system first checks whether any endpoints are overloaded and if so, determines a percentage of requests to load shed. The system measures an error that matches the amount by which the system is overloaded. While a service is being overloaded, the online system aims to keep up throughput. For example, the online system ensures that incoming requests are equal to returning requests. To capture inbound and returning requests, the online system captures the number of enqueued and dequeued requests from the priority queue as IN and OUT respectively. The system determines overload percentage as error=(IN−OUT)/OUT. The online system uses the error percentage to correct the value and output the actual rejection threshold used by the system. The online system converts the percentage to a request rank (for example, a combination of a priority and cohort) by looking at a set of recent requests, for example, the last 1000 requests. For example, if the online system determines that 10% of the requests should be shedded, the online system sorts the last 1000 requests by priority and cohort. The system uses the priority and cohort of the 10th percentile as the threshold values.

Computer Architecture

Figure 8:
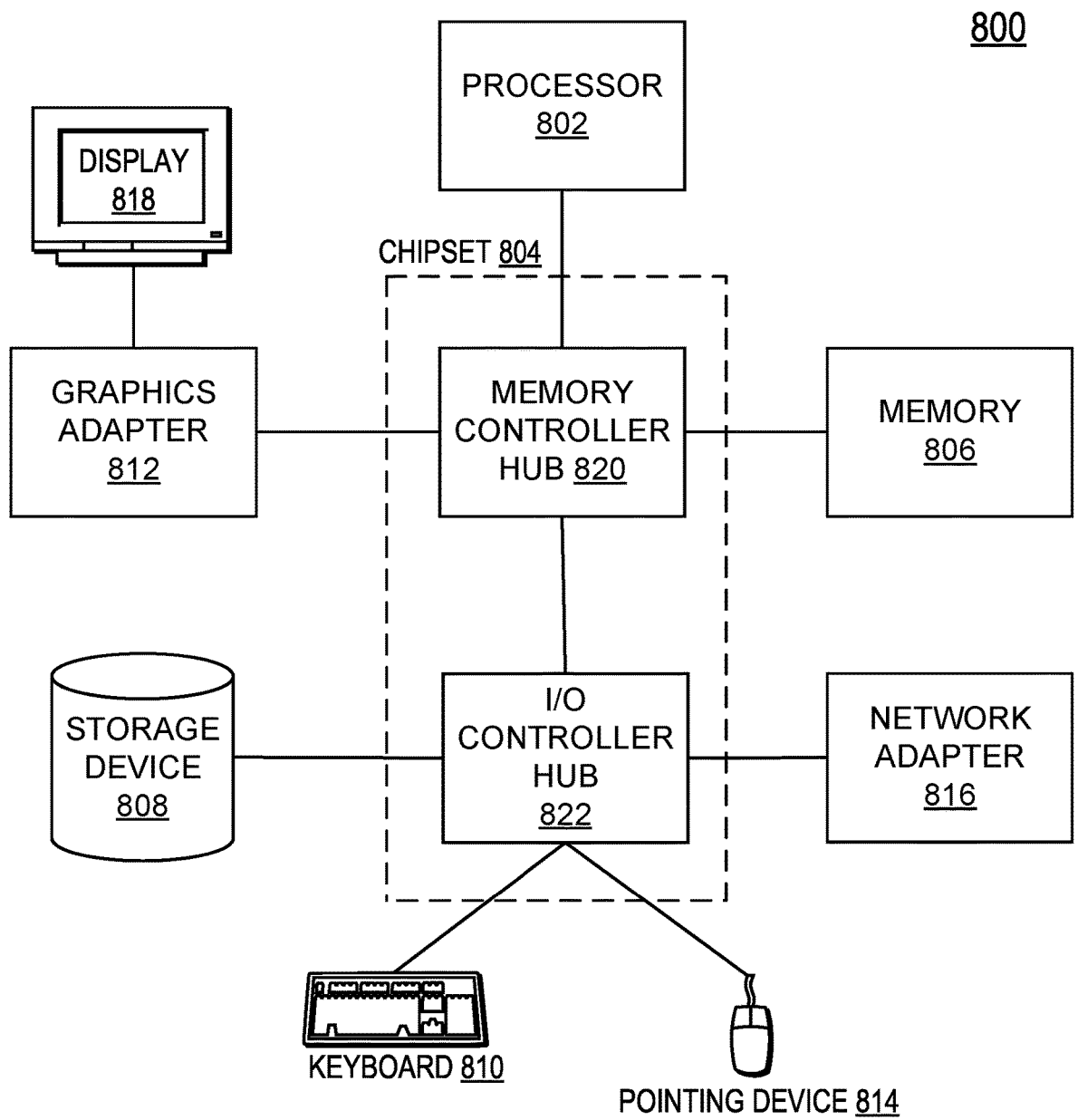
FIG. 8 is a high-level block diagram illustrating physical components of a computer used as part or all of the client device from FIG. 1, according to one embodiment.

FIG. 8 is a high-level block diagram illustrating physical components of a computer used as part or all of the client device from FIG. 1, according to one embodiment. Illustrated are at least one processor 802 coupled to a chipset 804. Also coupled to the chipset 804 are a memory 806, a storage device 808, a graphics adapter 812, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 couples the computer 800 to a local or wide area network.

As is known in the art, a computer 800 can have different and/or other components than those shown in FIG. 4. In addition, the computer 800 can lack certain illustrated components. In one embodiment, a computer 800 acting as a server may lack a graphics adapter 812, and/or display 818, as well as a keyboard or pointing device. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method executed by a system comprising:
receiving a plurality of requests for processing, wherein:
(i) each request is associated with a user, a tier and a cohort,
(ii) the tier is based on a type of the request and the cohort is based on the user, and
(iii) a threshold tier and a threshold cohort indicate a threshold priority of requests;
when the system is overloaded, for each of a set of unprocessed requests of the plurality of requests:
(i) rejecting an unprocessed request when the unprocessed request has a priority below the threshold priority of requests, wherein the priority is based on a relationship between the associated tier of the unprocessed request and the threshold tier and the associated cohort of the unprocessed request and the threshold cohort; and
(ii) processing a subset of the set of unprocessed requests that are not rejected, wherein:
the threshold tier and threshold cohort are based on a plurality of requests received in a predetermined time interval and a cumulative distribution of frequency of occurrence of requests in each cohort of each tier corresponding to a percentage of unprocessed requests to be rejected, the percentage is based on a current number of unprocessed requests and an aggregate value, and
the aggregate value is based on a number of unprocessed requests over the predetermined time interval.

2. The method of claim 1, wherein the system is overloaded when a number of unprocessed requests exceeds a threshold value.

3. The method of claim 1, wherein the system comprises:
a load shedding module; and
a request processing module.

4. The method of claim 3, wherein the load shedding module comprises:
a request priority module;
a load shedding percentage module;
a threshold priority module;
a request handling module; and
a request queue.

5. The method of claim 3, wherein the percentage of unprocessed requests to be rejected is updated periodically, and the threshold tier and threshold cohort are adjusted periodically based on the updated percentage of unprocessed requests.

6. The method of claim 1, wherein:

a service sends an unprocessed request to the system, the corresponding tier for the unprocessed request is based on a mapping from services running in the system to tiers, and each service is assigned to a tier.

7. The method of claim 1, wherein:

the associated cohort for an unprocessed request is based on a user identification of the user that sent the request and a value of a current time, the associated cohort of the request has a first value when the current time is within a time interval, and the associated cohort of the request has a second value when the current time is outside the time interval.

8. The method of claim 1, wherein:

requests for performing operations related to infrastructure of the system are associated with a first tier, and requests representing actions requested by users external to the system are associated with a second tier having lower priority compared to the first tier.

9. The method of claim 8, wherein:

requests representing test activities are associated with a third tier having lower priority compared to the second tier.

10. The method of claim 1, wherein:

the tier is from a plurality of tiers ranked by priority, and each tier of the plurality of tiers is associated with a plurality of cohorts ranked by priority.

11. The method of claim 1, further comprising:

storing the requests in a priority queue for processing higher priority requests before lower priority requests.

12. The method of claim 11, wherein a tier and the cohort of an identified request of the priority queue are the threshold tier and the threshold cohort, the identified request is based on an overload percentage, and the overload percentage is based on a number of enqueued requests and a number of dequeued requests associated with the priority queue.

13. A computer system comprising:

one or more computer processors; and a non-transitory computer-readable storage medium storing instructions that, when executed by the one or more computer processors, cause the one or more computer processors to perform steps comprising:

receiving a plurality of requests for processing, wherein:

(i) each request is associated with a user, a tier and a cohort, (ii) the tier is based on a type of the request and the cohort is based on the user, and (iii) a threshold tier and a threshold cohort indicate a threshold priority of requests;

when the system is overloaded, for each of a set of unprocessed requests of the plurality of requests:

(i) rejecting an unprocessed request when the unprocessed request has a priority below the threshold priority of requests, wherein the priority is based on a relationship between the associated tier of the unprocessed request and the threshold tier and the associated cohort of the unprocessed request and the threshold cohort; and (ii) processing a subset of the set of unprocessed requests that are not rejected, wherein:

the threshold tier and threshold cohort are based on a plurality of requests received in a predetermined time interval and a cumulative distribution of frequency of occurrence of requests in each cohort of each tier corresponding to a percentage of unprocessed requests to be rejected, the percentage is based on a current number of unprocessed requests and an aggregate value, and the aggregate value is based on a number of unprocessed requests over the predetermined time interval.

14. The system of claim 13, wherein the system is overloaded when a number of unprocessed requests exceeds a threshold value.

15. The system of claim 13, wherein the system comprises:

a load shedding module; and a request processing module.

16. The system of claim 15, wherein the load shedding module comprises:

a request priority module;

a load shedding percentage module;

a threshold priority module;

a request handling module; and a request queue.

17. The system of claim 13, wherein:

a service sends an unprocessed request to the system, the corresponding tier for the unprocessed request is based on a mapping from services running in the system to tiers, and each service is assigned to a tier.

18. The system of claim 13, wherein:

the associated cohort for an unprocessed request is based on a user identification of the user that sent the request and a value of a current time, and the associated cohort of the request has a first value when the current time is within a time interval, and the associated cohort of the request has a second value when the current time is outside the time interval.

19. The system of claim 13, wherein:

requests for performing operations related to infrastructure of the system are associated with a first tier, requests representing actions requested by users external to the system are associated with a second tier having lower priority compared to the first tier, and requests representing test activities are associated with a third tier having lower priority compared to the second tier.

20. The system of claim 13, wherein:

the tier is from a plurality of tiers ranked by priority, and each tier of the plurality of tiers is associated with a plurality of cohorts ranked by priority.

* * * * *

UNITED STATES PATENT AND TRADEMARK OFFICE
CERTIFICATE OF CORRECTION

| | |
|---|---|
| PATENT NO. | : 12,340,252 B2 |
| APPLICATION NO. | : 17/850378 |
| DATED | : June 24, 2025 |
| INVENTOR(S) | : Thomsen et al. |

Page 1 of 1

It is certified that error appears in the above-identified patent and that said Letters Patent is hereby corrected as shown below:

In the Claims

In Column 11, in Claim 12, Line 40, after "wherein" insert -- : --.

In Column 12, in Claim 17, Lines 36-39, after "system," delete "the corresponding tier for the unprocessed request is based on a mapping from services running in the system to tiers, and" and insert the same from Line 37, as a new paragraph/point.

Signed and Sealed this
Twenty-third Day of September, 2025

John A. Squires
*Director of the United States Patent and Trademark Office*